United States Patent [19]

Dammeyer

[11] 4,265,337

[45] May 5, 1981

[54] FORK LIFT TRUCK SPEED CONTROL DEPENDENT UPON FORK ELEVATION

[75] Inventor: Ned E. Dammeyer, New Bremen, Ohio

[73] Assignee: Crown Controls Corporation, New Bremen, Ohio

[21] Appl. No.: 57,771

[22] Filed: Jul. 16, 1979

[51] Int. Cl.³ .................. B66F 9/06; B60K 31/00; G05B 1/06; H02P 5/06
[52] U.S. Cl. .................. 187/9 E; 180/170; 180/271; 318/333; 318/652
[58] Field of Search .................. 187/9 R, 9 E, 38, 39; 180/170, 271, 282, 290; 318/17, 333, 478, 489, 460, 652

[56] References Cited

U.S. PATENT DOCUMENTS

| | | | |
|---|---|---|---|
| 2,751,994 | 6/1956 | Remde | 180/282 |
| 2,790,513 | 4/1957 | Draxler | 187/9 R |
| 2,935,161 | 5/1960 | Comfort | 187/9 R |
| 3,489,238 | 1/1970 | Kruckman | 180/170 |
| 3,524,522 | 8/1970 | Thomas et al. | 187/9 E |
| 3,542,161 | 11/1970 | Ulinski | 187/9 E |
| 3,633,086 | 1/1972 | Speth et al. | 318/489 |

Primary Examiner—Robert J. Spar
Assistant Examiner—Edward M. Wacyra
Attorney, Agent, or Firm—Biebel, French & Nauman

[57] ABSTRACT

A speed control circuit is provided for a lift truck which is driven by an electric truck drive motor powered from a power source through a motor controller. The motor controller is responsive to a power control signal generated by summing a speed sensor signal, which is derived by comparing a tachometer signal with a speed selection signal. A fork height sensor provides a fork height signal which is used to limit the maximum level of the speed control signal. A safety circuit monitors operation of the speed control circuit and disconnects the circuit from the motor controller upon occurrence of a malfunction.

10 Claims, 7 Drawing Figures

FORK LIFT TRUCK SPEED CONTROL DEPENDENT UPON FORK ELEVATION

BACKGROUND OF THE INVENTION

The present invention relates to speed control circuitry for controlling the speed of a fork lift truck and, more particularly, to such circuitry which accurately controls truck speed, while preventing the truck from exceeding a maximum speed dependent upon the height to which the lift forks are raised.

Fork lift trucks of the type controlled by the speed control circuit of the present invention are typically used to transport and handle goods and containers which are relatively large or heavy. Such a lift truck may be powered by an electric d.c. motor which is connected to rechargeable storage batteries carried on the truck. A pair of lift forks are mounted on an extendable fork mast for engaging the goods or containers being handled. The forks are raised as the goods or contaiers are carried by the truck. Additionally, the forks may be raised quite high, depending upon the construction of the truck, in order to position the goods or containers on a storage rack or to remove the goods or containers from such a rack.

It will be appreciated that transporting a load at a high rate of speed with the forks raised substantially above ground level may be somewhat dangerous. The overall center of gravity of the truck and the load is raised, thus reducing the stability of the truck.

A number of speed control arrangements have been suggested in the past for limiting the maximum speed attainable by a lift truck with the forks raised. Some arrangements have included a switch to sense when the forks are raised above a selected height, with the switch being connected in the electric motor power supply circuit, to prevent the application of full voltage to the driving motor when the forks are elevated.

Such arrangements have the disadvantage that they also limit the maximum power that can be applied to the motor at start up when the truck is completely stopped and the forks are raised. One approach to solution of this problem is shown in U.S. Pat. No. 2,790,513, issued Apr. 30, 1957, to Draxler. The Draxler patent discloses an electromechanical control arrangement in which a relay in the power supply circuit for the motor detects when the motor is approaching a stall condition and switches out the power limiting portion of the circuit.

The Draxler system has the disadvantage that only a single height level for the forks is detected to set a maximum permissible power level for the motor. As a result, the limiting portion of the circuit is either on or off. Additionally, the circuit does not provide true speed control, but rather limits the power supplied to the drive motor, regardless of the speed of the truck.

Accordingly, it is seen that there is a need for a speed control circuit for a lift truck which limits the speed of the truck in dependence upon the height to which the forks are raised and in which the speed of the truck is accurately limited and for a speed control circuit in which operation of the circuit is monitored and discontinued if a malfunction occurs.

SUMMARY OF THE INVENTION

A speed control circuit for a lift truck, which has an operator adjustable speed control mechanism, lift forks mounted on an extendable lift fork mast, an electric truck drive motor, an electric motor power source, and a motor controller for controlling the application of power to the drive motor from the power source in response to a power control signal, includes a speed selector means generating a speed selection signal in response to adjustment of the operator adjustable speed control mechanism. A fork height sensor means provides a fork height signal in dependence upon the height to which the lift forks are raised. A clamp circuit means is responsive to the speed selector means and to the fork height signal for providing a speed conrol signal corresponding to the speed selection signal, but having a maximum signal level determined by the fork height signal. A speed sensor means provides a speed sensor signal related to the speed of the lift truck. A summer means is responsive to the clamp circuit means and to the speed sensor means for comparing the speed control signal and the speed sensor signal to provide the power control signal to the motor controller in dependence upon the difference between the speed control signal and the speed sensor signal.

The speed control circuit may include safety circuit means for monitoring the operation of the speed sensor means and for disconnecting the summer means from the motor controller upon failure of the speed sensor means to provide a speed sensor signal. The safety circuit means may further comprise delay means for disabling the safety circuit means for a predetermined time period as power is applied to the drive motor with the truck being stopped.

The safety circuit means may futher comprise means for monitoring operation of the speed selector means and for disconnecting the summer means from the motor controller upon failure of the speed selector means. Additionally, the safety circuit means may comprise means for monitoring the continuity of a tachometer cable in the speed sensor means and for disconnecting the summer means from the motor controller if continuity of the cable is broken. The safety circuit means may also include relay means for disconnecting the summer means from the motor controller and relay delay means for providing a predetermined delay in operation of the relay means. Finally, the safety circuit means may include visual indicator means, actuated by the relay means, for providing a visual indication of operation of the safety circuit means.

The speed selector means may include a dead band compensation circuit for compensating for the dead band of the operator adjustable speed control mechanism.

The fork height sensor may include an ultrasonic height measuring means for measuring the height to which the lift forks are raised and for providing the fork height signal. Alternatively, other methods of measuring the fork height may be used.

The speed sensor means may comprise tachometer means responsive to movement of the lift truck to provide a tachometer output signal related in frequency to the speed of the lift truck, a frequency-to-voltage converter means, responsive to the tachometer output signal, for providing an output signal related in potential to the speed of the lift truck, low pass filter means for filtering the output signal from the converter means, and lead circuit means, responsive to the filtered output signal from the low pass filter means, for compensating for a phase lag induced in the output signal during filtering by the low pass filter means and for providing a speed sensor signal to the summer means.

Accordingly, it is an object of the present invention to provide a speed control circuit for a lift truck in which the maximum speed of the truck is determined by the height to which the lift forks are raised; to provide such a speed control circuit in which the actual speed of the truck is sensed; and to provide such a circuit in which operation of the circuit is monitored to assure reliable operation thereof.

Other objects and advantages of the invention will be apparent from the following description, the accompanying drawings and the appended claims.

DETAILED DESCRIPTION OF THE PREFERRED EMBODIMENT

Figure 1:
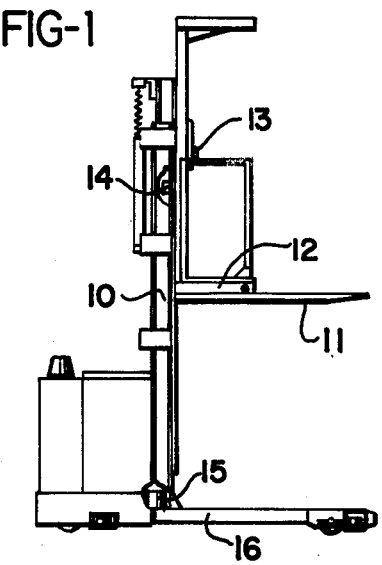
FIG. 1 is a side view of a fork lift truck illustrating the positioning of the height sensing devices for measuring height of the forks.

The present invention relates to a speed control circuit for a lift truck and, more particularly, to a circuit which limits the maximum speed of the truck in dependence upon the height to which the lift forks are raised, while monitoring the operation of the circuit. FIG. 1 illustrates a conventional fork lift truck of the type with which the speed control circuit of the present invention may be used. The fork lift truck includes an extendable fork lift 10 upon which lift forks 11 and operator support platform 12 are mounted. Although a stock picker type of truck is illustrated in which the operator platform is raised and lowered with the forks, it will be appreciated that the present invention will also find application on trucks of the type in which the operator remains at ground level. An operator adjustable speed control mechanism, such as lever 13, is provided to permit the operator to control the speed and direction of truck travel. The speed control mechanism has a central neutral position and, when moved forward or rearward from the neutral position, causes the truck to move forward or rearward, respectively, at a speed corresponding to the displacement of the control mechanism from its neutral position. Alternatively, a twist type control lever mechanism may be utilized. The lift truck is driven by an electric truck drive motor which is connected to an electric motor power source, such as a plurality of batteries, through a motor controller. The motor controller controls application of power to the drive motor in correspondence to the position of lever 13.

Figure 2:
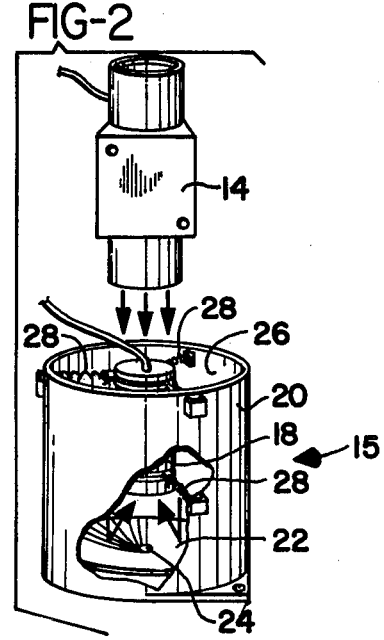
FIG. 2 illustrates the construction of an ultrasonic transmitter and an ultrasonic receiver which may be used to measure fork height in the present invention.

In order to control the speed of the truck in dependence upon the fork height, it is necessary to provide an arrangement for sensing the height of the forks and producing an electrical indication of fork height. Such an arrangement may take the form of a simple potentiometer which is mechanically linked to the mast 10 such that the resistance of the potentiometer is varied in dependence upon extension of the mast. As shown in FIGS. 1 and 2, however, an ultrasonic height measuring arrangement may also be provided for determining fork height and providing an accurate electrical indication thereof.

As shown in FIG. 1, an ultrasonic transmitting transducer 14 is mounted on the platform 12 and is raised and lowered along with the forks 11. The transducer, when appropriately energized, projects downward an acoustic energy burst which is received by a receiving transducer device 15 mounted on the truck body 16 below the transmitting transducer device 14. The receiving transducer device 15, shown generally in FIG. 2, receives the acoustic energy burst and converts this burst into an electrical signal. As is clear, the time required for the acoustic energy burst to travel from the transmitting transducer device 14 to the receiving transducer device 15 is directly related to the height to which the forks 12 are raised.

The construction of the transmitting and receiving transducer devices 14 and 15, respectively, is illustrated in FIG. 2. The construction of these devices is disclosed more fully in copending patent application, Ser. No. 57,772 filed on even date herewith. Generally, the receiving transducer device 15 includes a downward facing transducer 18 which is mounted centrally within a transducer 18 which is mounted centrally within a transducer casing 20. A parabolic reflector 22 is positioned in the bottom of the casing 20 such that the downward projected acoustic energy bursts are reflected by reflector 22 upward and focused onto the receiving transducer 18. by providing for downward facing transmitting and receiving transducers, the possibility of dirt or other foreign material accumulating on the transducer surfaces and impairing transducer operation is eliminated. The parabolic reflector 22 defines a central hole 24 which permits dust and other material falling into the casing 20 to drop through the casing.

The receiving transducer 18 is positioned generally centrally in the casing cavity 26 by means of springs 28 which extend radially outward from the transducer 18 and provide for mounting of the transducer 18 and mechanical isolation of the transducer from the casing 20 and the truck body to which casing 20 is attached.

Figure 3:
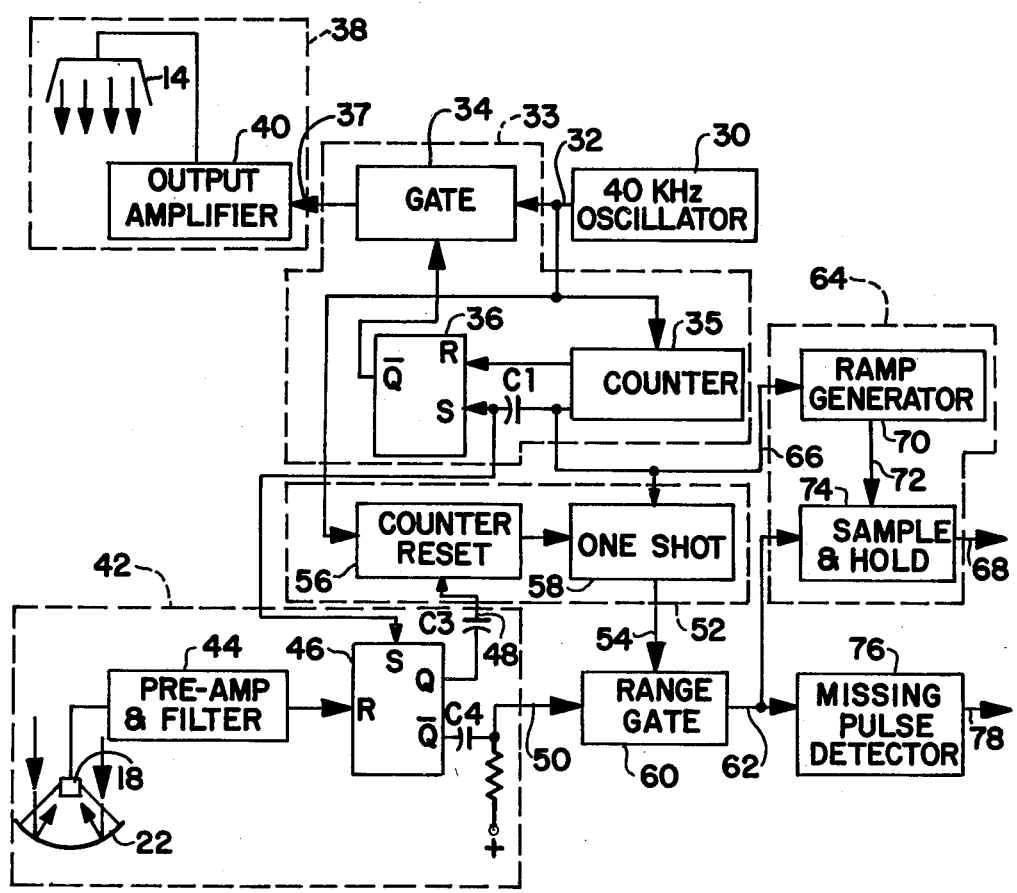
FIG. 3 is a block diagram illustrating the ultrasonic distance measuring circuit.

Reference is now made to FIG. 3 which is a block diagram illustrating ultrasonic distance measuring apparatus for providing a fork height signal for processing by the speed control circuit of the present invention. This apparatus forms the subject of copending application, Ser. No. 57,921, filed on even date herewith and assigned to the assignee of the present invention. A reference oscillator means comprises an oscillator 30 which provides a reference oscillator signal on line 32 at approximately 40 KHz. A burst generator means 33, including gate 34, counter 35, and flip flop 36, is responsive to the reference oscillator 30 for periodically generating ultrasonic bust signals on line 37. Ultrasonic burst signals on line 37 may comprise 40 KHz bursts, each lasting for approximately 1.6 milliseconds and occurring at the rate of 20 bursts per second. An ultrasonic transmitting transducer means 38, including transmitting transducer 14, and an output amplifier 40, is responsive to the burst generator means 34 for providing an ultrasonic acoustic energy burst in response to each of the ultrasonic burst signals.

An ultrasonic receiving transducer means 42, including transducer 18, reflector 22, preamplifier and filter 44, and flip flop 46, receives the ultrasonic acoustic energy bursts generated by the transmitting transducer 14 and provides detection signals on lines 48 and 50 in response thereto. A range window means 52 is responsive to the receiving transducer means 42 and to the oscillator means 30 for providing a range window signal on line 54 at a time lagging each detection signal by a predetermined time period. The range window means includes a counter 56 and a monostable multivibrator 58.

A range gate means 60 is responsive to the range window signal on line 54 and to the detection signal on line 50 for providing output gate signals on line 62 upon occurrence of a detection signal coincident with a range window signal. A converter means 64 is responsive to a signal on line 66 indicating the generation of an ultrasonic burst signal by burst generator means 33. The converter means 64 is further responsive to the output gate signal on line 62 for providing an output distance signal on line 68 which is related in potential to the distance between the transmitting and receiving transducer means. Converter means 64 includes a ramp generator means 70 which provides a linear time varying ramp signal on line 72 in response to the occurrence of a burst signal. The sample and hold circuit 74 is responsive to the ramp signal on line 72 and to the range gate 60 for sampling the ramp signal upon receipt of the output gate signal on line 62, thus providing an output distance signal equal in potential to the ramp signal at the instant of sampling.

A pulse monitor means, including missing pulse detector circuit 76, monitors the output of the range gate means 60 and provides a missing pulse signal output on line 78 upon failure of a detection signal to occur within a predetermined period of time.

Figure 4:
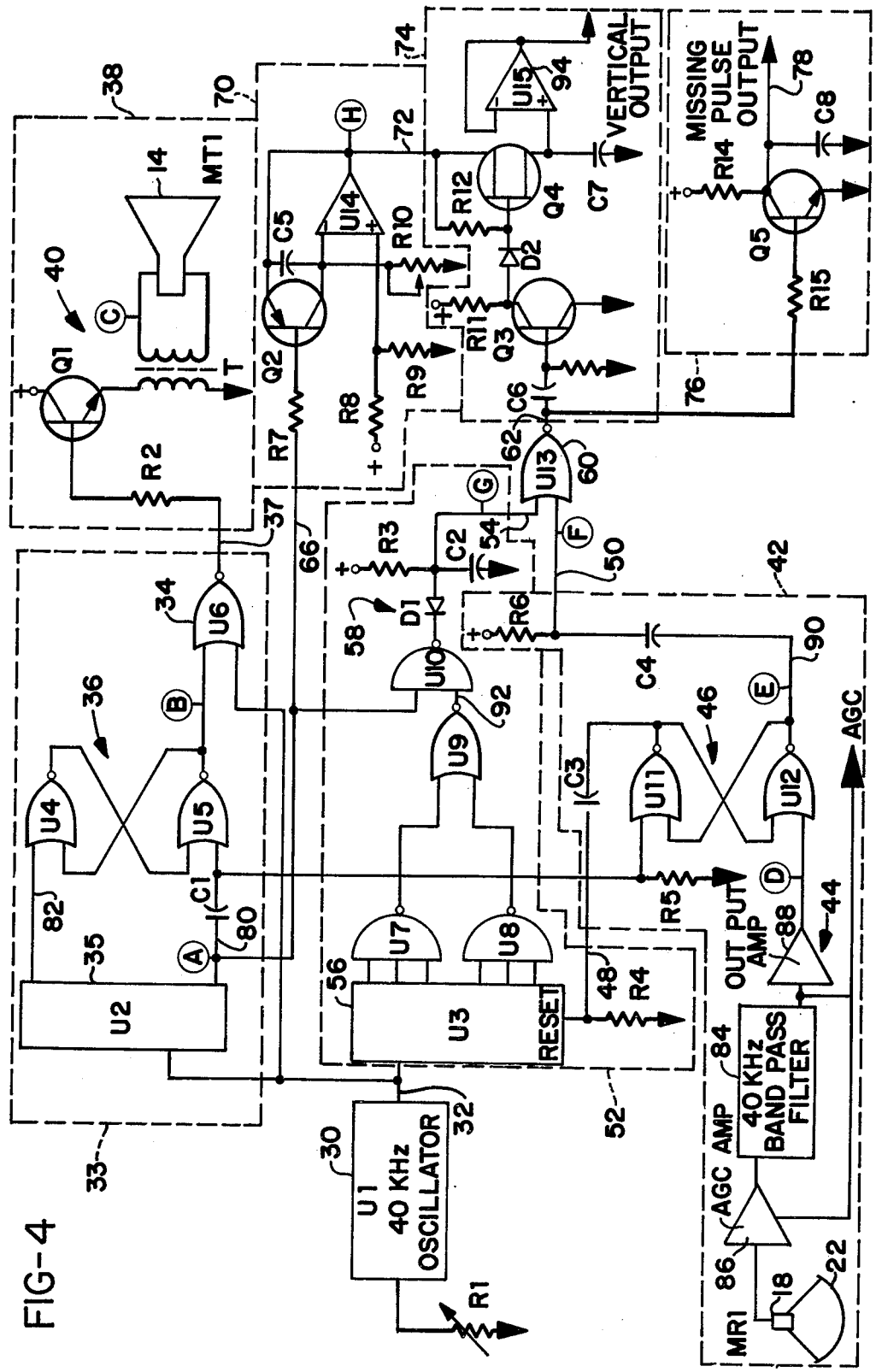
FIG. 4 is a schematic diagram illustrating the circuit of FIG. 3 in greater detail.
Figure 5:
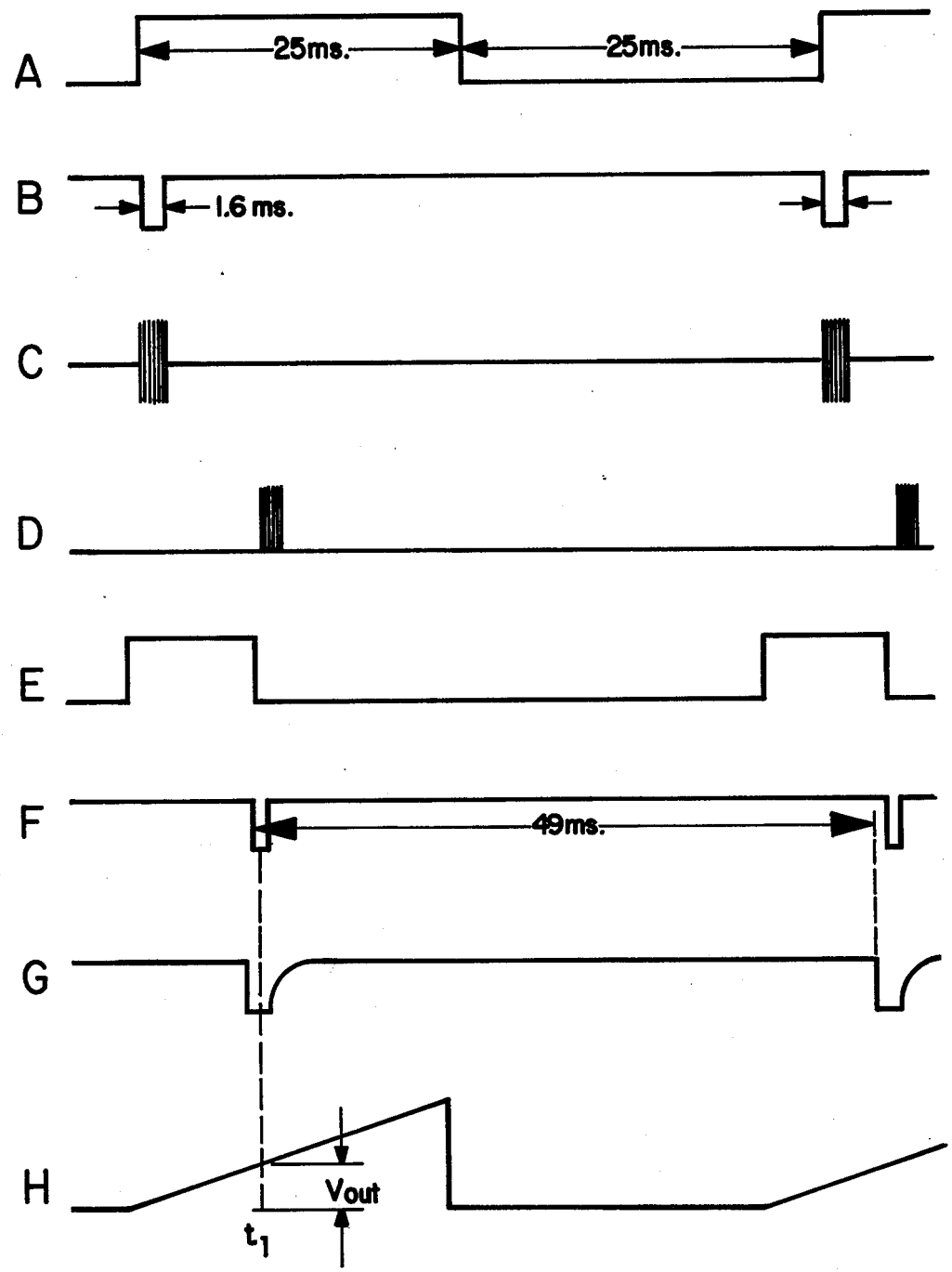
FIG. 5 is a signal diagram illustrating the signal levels at various points in the circuit of FIG. 4 during operation of the circuit.

Reference is now made to the circuit diagram of FIG. 4 and the signal diagram of FIG. 5 in which circuit operation is illustrated. The encircled letters A–H in the schematic diagram of FIG. 4 refer to the signals illustrated in FIG. 5.

Reference oscillator 30 includes a 40 KHz oscillator which, if desirable, may be adjusted in frequency by means of resistor R. The 40 KHz oscillator output is supplied to burst generator 33 which includes a counter 35. Counter 35 has two outputs which are supplied to crosscoupled NOR gates U4 and U5 which together form the flip flop 36. The counter 35 is a binary counter which divides down the 40 KHz signal on line 32 by a factor of 2048 to generate a 20 Hz output signal A on line 80 which alternately goes high and low every 25 milliseconds. Counter 35 provides a divided down signal on line 82 at 1/64th of the frequency of the oscillator signal. Thus, an output is provided on line 82 1.6 milliseconds after the output on line 80. Capacitor C1 differentiates the 25-millisecond pulse and applies a positive going spike to the input of gate U5 which sets the flip flop 36, thus causing the B output to go low. At a time 1.6 milliseconds later, the flip flop 36 is reset, thus returning the output B to a high state. As will be appreciated, gate 34 is enabled only during the 1.6 millisecond intervals when the B signal goes low and these intervals occur at the rate of 20 times per second. Gate 34, when enabled, passes the 40 KHz oscillator signal from oscillator 30 to line 37. The signal on line 37 is amplified by amplifier 40 including transistor Q1 and transformer T and supplied as signal C to the transmitting ultrasonic transducer 14.

Transmitting transducer 14 produces a burst of acoustic energy which is received by receiving transducer means 42 which includes the transducer 18 and reflector 22. Ultrasonic receiving transducer means 42 includes a 40 KHz band pass filter 84, as well as a gain control amplifier 86 and an output amplifier 88. The signal D resets the flip flop 46, which was previously set at the time the burst generator means enabled gate 34. Resetting flip flop 46 provides a detection signal pulse on line 48 via capacitor C3, resetting counter 56 of range window means 52 to a zero count state. Simultaneously, the signal E on output 90 is differentiated by capacitor C4 to produce a detection signal F in the form of a negative going spike on line 50. This detection signal is supplied to the range gate 60 which passes the detection signal only if it occurs during a range window time period.

As illustrated in FIG. 5, the range window signal G is generated approximately 49 milliseconds after occurrence of the previously received detection signal. Since the detection signals occur successively at the same rate at which successive ultrasonic burst signals are generated, successive detection signals can be expected to occur approximately every 50 milliseconds, regardless of the distance between the transmitting and receiving transducers and regardless of the time delay between transmission of an ultrasonic acoustic energy burst and receipt of the burst.

This 49-millisecond period is timed by counter 56, which is reset by a pulse on line 48 upon occurrence of a detection signal. Counter 56 then begins counting and provides, through gates U7, U8, and U9, a signal on line 92 which goess high approximately 49 milliseconds subsequent to the previously received ultrasonic acoustic energy burst. Gate U10, diode D1, resistor R3, and capacitor C2 form a monostable multivibrator circuit which, when enabled by a high signal on line 92 and a high output on line 66, provides a low going signal G of fixed duration on line 54. When the inputs of gate U10 both go high, the output of gate U10 is grounded, discharging capacitor C2 through diode D1. A fixed time period is required thereafter for recharging capacitor C2 through resistor R3. Thus, a range window signal having a predetermined fixed range window time period is supplied to range gate 60. Gate 60, upon simultaneous receipt of the detection signal on line 50 and the range window signal on line 54, provides a high going gate output signal on line 62. The output gate signal on line 62 turns on transistor Q3 which, in turn, switches on FET Q4. This permits capacitor C7 to charge to the instantaneous level of a linear time varying ramp signal 8 provided on line 72. Thus, as shown in FIG. 5, occurance of a detection signal at time $t_1$ results in the capacitor C7 being charged to the instantaneous potential level $V_{out}$ of the ramp signal H. Buffer 94 provides the desired output distance signal which is related to the distance between the transmitting and receiving transducers.

The ramp generator means 70 is enabled by a high going signal on line 66 which occurs at the initiation of an ultrasonic burst signal. This high going signal turns off transistor Q2, permitting capacitor C5 to be charged at a linear rate. The charging rate can be adjusted by adjustment of resistor R10, thus varying the slope of the generated ramp function and changing the voltage-to-distance scale factor. The ramp signal H is sampled once every 50 milliseconds, provided the received burst occurs simultaneously with the range window signal G, and the output of buffer 94 therefore continues to be representative of the distance between the transducers.

Circuit 76 monitors generation of gate output signals on line 62. Should malfunction occur in the system, the capacitor C7 would not have its charge updated as required and the output 68 would remain unchanged, thus providing a false indication of distance, assuming movement of the transmitting transducer. In order to provide an indication of such a malfunction, transistor Q5 conducts on each pulse of the gate output signal and maintains capacitor C8 in a discharge state. Should 10 or more successive gate pulses be missed, indicating a malfunction of approximately one-half second, capacitor C8 is charged through resistor R14 to a potential substantially equal to the positive d.c. reference, indicating that an error has occurred in the system.

Figure 6:
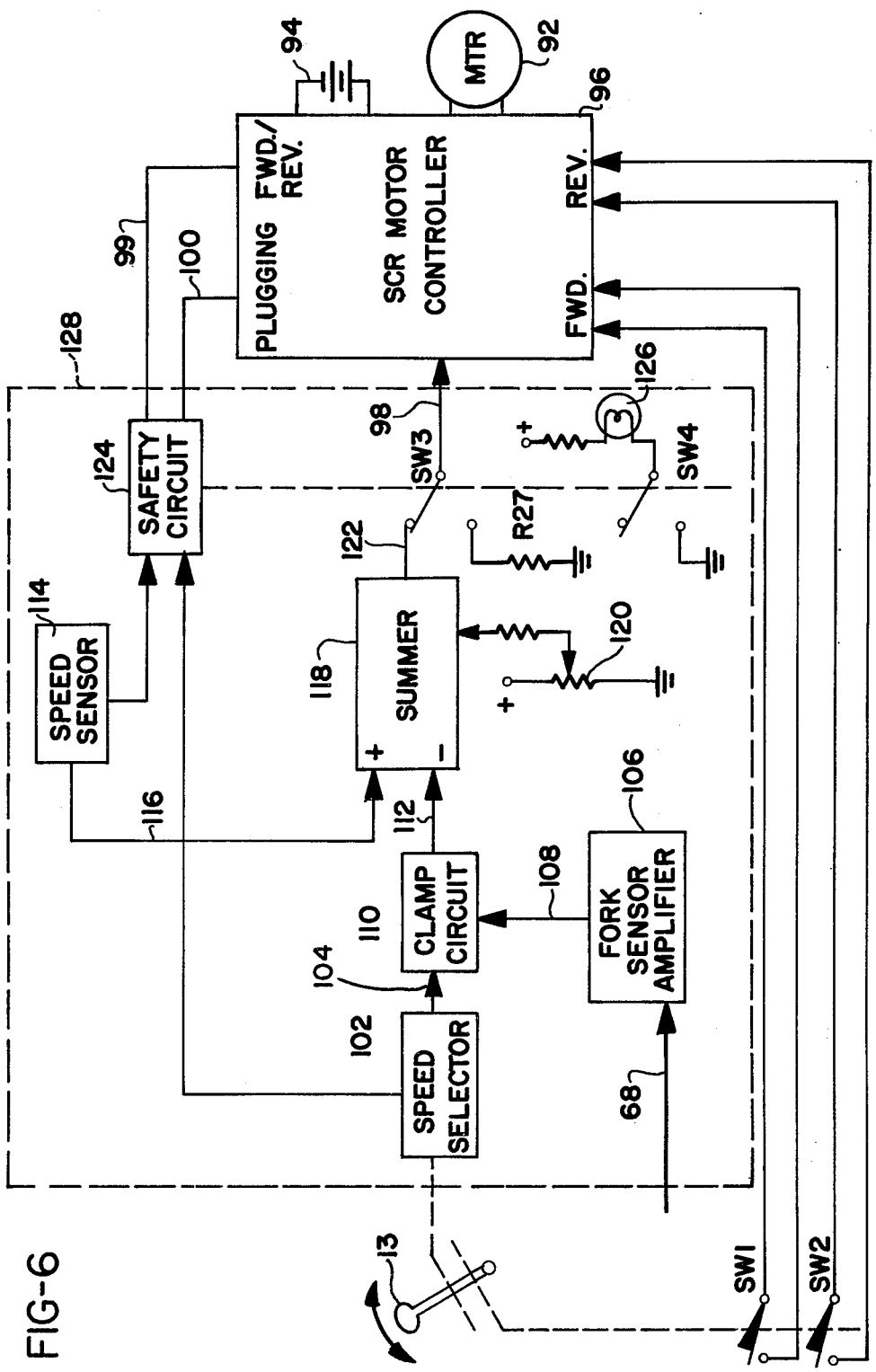
FIG. 6 is a block diagram illustrating the speed control circuit of the present invention.

Reference is now made to FIG. 6 which is a block diagram illustrating the speed control circuit of the present invention. As discussed above, the lift truck with which this circuit is used includes an operator adjustable speed control mechanism, such as lever 13, an electric truck drive motor 29, which may typically comprise a d.c. electric motor, an electric motor power source, such as batteries 94, and a motor controller 96 which controls the application of power to the drive motor 92 from the power source 94 in response to a power control signal on line 98. Motor controller 96 may typically comprise an EV1 SCR motor controller, available from the General Electric Company. Such a controller provides power to the motor 92 in direct correspondence to the amplitude of the power control signal on line 98.

The motor 92 is electrically connected for forward movement of the truck when switch SW1 is closed and, similarly, electrically connected for reverse movement of the truck when swtich SW2 is closed. Switches SW1 and SW2 are mechanically connected to lever 13, with switch SW1 being closed as lever 13 is moved forward from its neutral position and switch SW2 being closed as lever 13 is moved rearwardly from its neutral position.

Motor controller 96 provides a high output on line 99 whenever either of the switches SW1 or SW2 is actuated. Similarly, motor controller 96 provides a high output on line 100 when the truck is operated in a plugging mode. Plugging is accomplished by moving the speed control mechanism such that power is applied to the motor tending to drive the motor in a direction opposite to that in which the truck is moving. For example, as the truck is moving in the forward direction, the driver may move the lever 13 to a position corresponding to reverse movement of the truck. The motor 92, therefore, acts as a dynamic brake, slowing the truck to a stop and, if the lever 13 remains in the reverse position, thereafter causing the truck to move in a reverse direction.

A speed selector means includes speed selector circuit 102 which generates a speed selection signal on line 104 in response to adjustment of the operator adjustable speed control mechanism 13. A fork height sensor amplifier 106, which may be connected to an ultrasonic height sensing arrangement as shown in FIGS. 2-5, provides a fork height signal on line 108 in dependence upon the height to which the left forks are raised. A clamp circuit 110 is responsive to the speed selector circuit 102 and to the fork height signal on line 108 for providing a speed control signal on line 112, corresponding to the speed selection signal on line 104 but having a maximum signal level determined by the fork height signal on line 108. A speed sensor means includes speed sensor circuit 114 which provides a speed sensor signal of line 116 which is related to the speed of the lift truck.

A summer means, including summer 118 and potentiometer 120, is responsive to the clamp circuit 110 and to the speed sensor 114, for comparing the speed control signal and the speed sensor signal to provide the power control signal on line 122 to the motor controller 96. Potentiometer 120 provides a minimum "creep" signal to the summer 118. The motor controller 96 applies to motor 92 in dependence upon the potential level of the power control signal on line 98. The amount of power supplied to motor 92 is inversely related to the level of the signal on line 98, with the greatest amount of power being applied to motor 92 when the power control signal is at zero volts. No power is applied to motor 92 when the signal on line 98 is increased to 3.5 volts.

A safety circuit 124 monitors operation of the speed selector circuit 102 and the speed sensor circuit 114 and, upon failure of either of the monitored circuits, disconnects the summer circuit 118 from the motor controller 96 by actuating relay switch SW3. Controller 96 senses connection of resistor R27 to line 98 by relay switch SW3 and thereafter permits a low level voltage to be applies to motor 92 by actuation of switches SW1 and SW2. Thus, the truck may be driven at low speed to a repair location. Simultaneously with actuation of SW3, relay switch SW4 is actuated and lamp 126 is energized such that it provides a visual indication of a malfunction in the speed control circuit.

Figure 7:
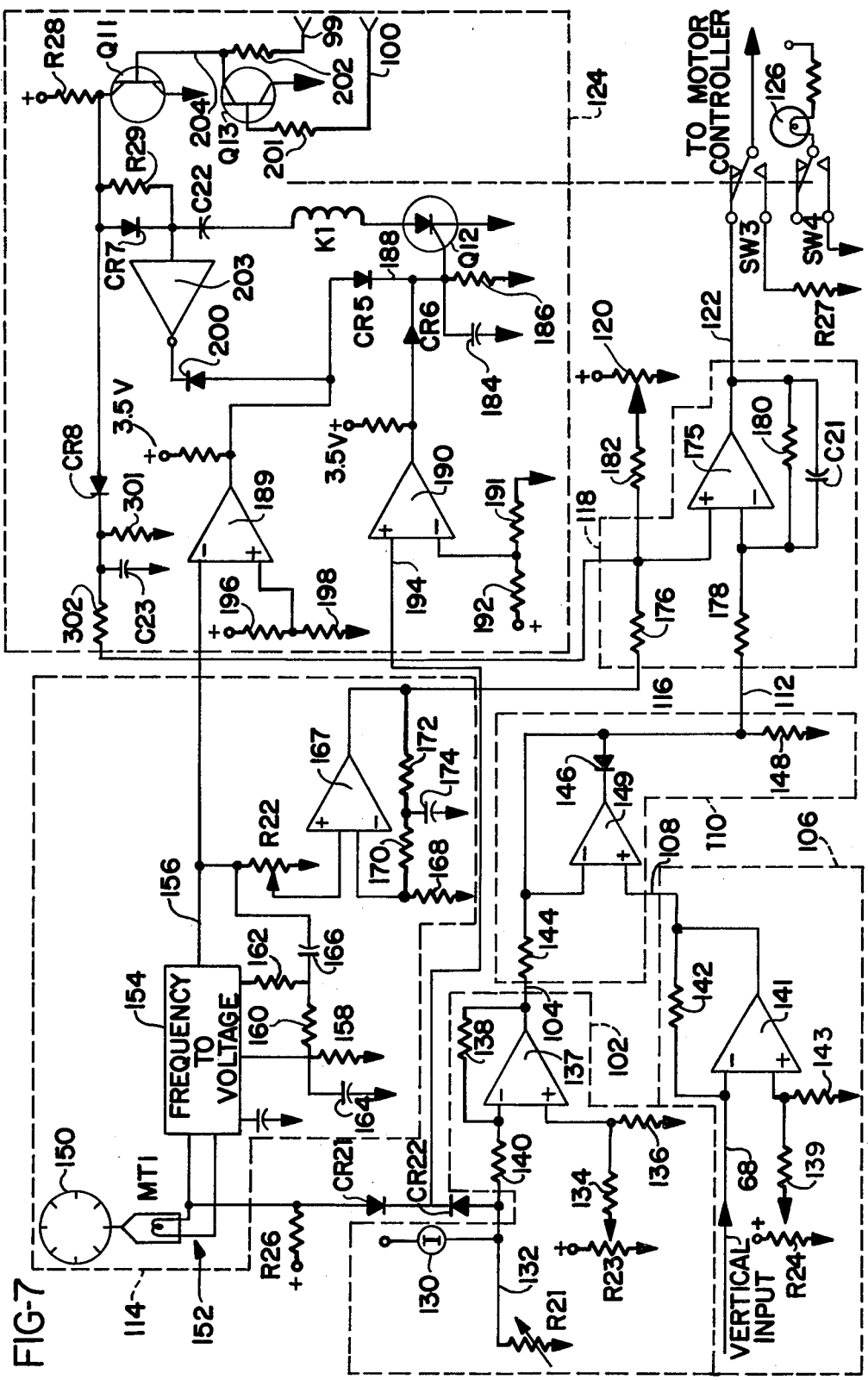
FIG. 7 is a schematic diagram illustrating the speed control circuit of FIG. 6 in greater detail

Reference is now made to FIG. 7 which illustrates the details of portion 128 of the circuit of FIG. 6. The speed selector circuit 102 includes a variable potentiometer R21 which is mechanically linked to lever 13 such that it decreases in resistance as the lever 13 is moved away from its neutral position in either the forward or reverse directions. The potentiometer R21 is connected to constant current source 130 such that line 132 receives a potential directly related to the resistance of potentiometer R21. When the lever 13 is in its neutral position, line 132 receives a potential of approximately 7 volts, and when the lever 13 is moved to a maximum speed setting, the voltage on line 132 is approximately zero.

Resistor R23, in conjunction with resistors 134 and 136, supplies a voltage to the positive input of amplifier 137, which includes feedback resistor 138. The potential on line 132 is supplied to the negative input of amplifier 137 via resistor 140. Resistor R23 is set such that the output 104 is approximately zero volts when the lever 13 is in its neutral position. As the lever 13 is moved in either direction toward a maximum speed setting, the potential on line 132 drops, with the result that the output of summing amplifier 137 increases. Resistors R23, 134, and 136 comprise a deadband circuit which provides a deadband between the closure of switches SW1 and SW2 and sufficient movement of lever 13 to produce a minimum movement of the truck.

The fork height sensor amplifier circuit 106 receives the height indication signal on line 68 from the sample and hold circuit 74 of FIG. 4. The signal on line 68 increases from approximately zero volts when the forks are completely lowered to approximately 8 volts when the forks are raised completely. Resistor R24 and resistors 139 and 143 supply a bias signal to the positive input of amplifier 141, which includes feedback resistor 142. The height indication signal on line 68 is subtracted from the bias signal to provide a fork height signal on line 108 which drops in potential as the forks are raised.

Clamp circuit 110, consisting of resistor 144, diode 146, resistor 148, and amplifier 149, receives the speed selection signal from line 104 and the fork height signal on line 108. Clamp circuit 110 provides a speed control signal to line 112 which is directly proportional to the speed selection signal on line 104, as long as the diode 146 is reverse bias. When the fork height signal on line 108 has dropped sufficiently, such that the output of amplifier 149 is less than the signal on line 112, the diode 146 becomes forward biased, thus clamping the speed control signal on line 112 to a predetermined level. It is seen, therefore, that the predetermined maximum level of the speed control signal on line 112 is a function of the height to which the forks are raised.

The speed sensor circuit 114 includes a tachometer means such as a magnetic pickup transducer MT1 which is mounted in close proximity to a plurality of segments which are machined in the brake drum of a truck drive mechanism indicated generally at 150. The magnetic pickup transducer MT1 provides tachometer pulses via tachometer cable 152 to a frequency-to-voltage converter means 154, which may be a National Semiconductor integrated circuit LM2917. Converter 154 provides an output signal on line 156 which is proportional in voltage to the frequency of the tachometer signal pulses on line 152, and thus related to the speed of the lift truck. The voltage on line 156 is smoothed by a low pass filter means consisting of resistors 158, 160, and 162 and capacitors 164 and 166. The level of output signal on line 156 is adjusted by potentiometer R22 and supplied to a lead circuit means including amplifier 167, resistors 168, 170, 172, and capacitor 174. The lead circuit provides compensation for a phase lag produced in the output 156 from converter 154 by the low pass filer.

The speed sensor signal on line 116 is supplied to the positive input of amplifier 175 via resistor 176. Similarly, the speed control signal on line 112 is supplied to the negative input of amplifier 175 via resistor 178. Amplifier 175, in conjunction with resistor 180 and smoothing capacitor C21, compares the speed control signal and the speed sensor signal to provide a power control signal on line 122 to the motor controller in dependence upon the difference between the speed control signal and the speed sensor signal. When full power is to be applied to the motor 92 by the controller 96, the power control signal on line 98 is approximately zero volts. When no power is applied to the motor 92, the power control signal is set at approximately 3.5 volts.

When operation has been initiated by closing SW1 or SW2, the truck rapidly accelerates to the speed selected by the speed controller R21. To provide a softer start, CR8, C23, 301 and 302 bias amplifier 175 to the no power voltage of 3.5 v with the truck stopped. When the truck begins moving, the collector voltage of Q1 falls, as descrbied more completely below, causing C23 to discharge at a slow rate and gradually lower this 3.5 v level to the power control signal. If the control lever 13 moved just to the point of closure of SW1 or SW2 (in the dead band area set by potentiometer R23), the truck will accelerate to a "creep" speed established by the creep potentiometer 120.

Safety circuit 124 provides a means for monitoring the operation of the speed sensor circuit 141 and also for monitoring the operation of the speed selector circuit 102. The safety circuit 124 disconnects the summer circuit 118 from the motor controller 96 upon detection of a circuit failure. Safety circuit 124 includes a relay coil K1 which is energized by SCR Q12. When coil K1 is energized, relay contacts SW3 and SW4 are switched into their lower switch positions, with the result that resistor R27 is connected to line 98 and warning indicator lamp 126 is illuminated. Circuit 96, upon the switching of switch S3, provides only a low level of power to motor 92, thus permitting the truck to be driven slowly by actuating switches SW1 and SW2 to a maintenance location for repair. The SCR Q12 is energized after a delay determined by capacitor 184 and resistor 186 when a high signal is supplied to node 188 by either comparator 189 or comparator 190. Comparator 190 normally has a zero output since its negative input, as defined by resistors 191 and 192, is normally greater than its positive input on line 194. Line 194 receives a substantial voltage, however, in the event that cable 152 should break. One side of this cable is grounded in the converter 154 and, therefore, diode CR21 is normally reverse biased.

If the cable 152 breaks, however, the diode CR21 becomes forward biased and a substantial potential is applied to line 194 via resistor R26. An error condition in which line 132 breaks is also detected by the application of a substantial potential from the current source 130 via diode CR22. This monitoring arrangement is provided since cable 152 and line 132 are relatively lengthy. If safety circuit 124 were not provided to monitor cable 152 and line 132, the feedback control provided by the circuit would be lost and maximum power would be applied to the motor if cable 152 were to break. If line 132 were to break the speed selector circuit would become inoperative and upon closure of SW1 or SW2, the truck would only move at a creep speed. With the present arrangement, however, such a failure results in a relatively low power level being supplied to the motor, thus permitting the truck to be driven slowly to a repair location.

Comparator 189 receives a reference potential set by resistors 196 and 198 which is relatively low such that the output from the frequency-to-voltage converter 154 exceeds the reference potential whenever the truck is driven at even a low rate of speed. Thus, the output of 189 is normally zero. Should the frequency-to-voltage converter 154 malfunction and fail to provide an output, however, the output of 189 will go high, thus causing the relay coil K1 to be energized. A momentary delay means for disabling the safety circuit for a predetermined time period as power is initially applied to the drive motor is provided, however, since without such a delay 189 would trip relay K1 each time the truck is started.

This delay circuit includes diode 200, diode CR7, capacitor C22, resistors R29, R28, 201, and 202, inverter 203, and transistors Q11 and Q13. At start up, a high signal is applied to line 99 from the controller 96 such that the capacitor C22 discharges through resistor R29 and transistor Q11. After capacitor C22 has discharged sufficiently, the output of 203 will go high, and diode 200 will become reverse biased. Prior to discharge of capacitor C22, however, the output of invertor 203 is held low, thus preventing energization of the K1 relay by comparator 189. Line 99 receives a high signal from motor controller 96 whenever the forward or reverse switches SW1 and SW2 are closed, thus initiating the timing delay operation. Line 100 receives a high signal from controller 96 when the truck is operated in the plugging mode for dynamic braking, thus preventing the application of a high signal from line 99 by grounding line 204 through transistor Q13.

While the forms of apparatus herein described constitute preferred embodiments of the invention, it is to be understood that the invention is not limited to these precise forms of apparatus, and that changes may be made therein without departing from the scope of the invention.

What is claimed is:

1. A speed control circuit for a lift truck which includes an operator adjustable speed control mechanism, lift forks mounted on an extendable lift fork mast continuously extendable between a lower and elevated positions, an electric truck drive motor, an electric motor power source, and a motor controller for controlling the application of power to said drive motor from said power source in response to a power control signal, comprising:

speed selector means generating a speed selection signal in response to adjustment of said operator adjustable speed control mechanism, fork height sensor means providing a continuously variable fork height signal in dependence upon the relative elevated position to which said lift forks are raised, clamp circuit means, responsive to said speed selector means and to said fork height signal, for providing a speed control signal corresponding to said speed selection signal but having a maximum signal level determined by said fork height signal, speed sensor means providing a speed sensor signal related to the speed of said lift truck and summer means, responsive to said clamp circuit means and to said speed sensor means, for comparing said speed control signal and said speed sensor signal to provide said power control signal to said motor controller in dependence upon the difference between said speed control signal and said speed sensor signal.

2. The speed control circuit of claim 1, further comprising:

safety circuit means for monitoring the operation of said speed sensor means and for disconnecting said summer means from said motor controller upon failure of said speed sensor means to provide said speed sensor signal.

3. The speed control circuit of claim 2, in which said safety circuit means further comprises delay means for disabling said safety circuit means for a predetermined time period as power is applied to said drive motor with said truck being stopped.

4. The speed control circuit of claim 2 in which said safety circuit means further comprises means for monitoring operation of said speed selector means and for disconnecting said summer means from said motor controller upon failure of said speed selector means.

5. The speed control circuit of claim 2 in which said speed sensor means comprises tachometer means responsive to movement of said lift truck to provide a tachometer output signal related in frequency to the speed of said lift truck, frequency-to-voltage converter means, and a tachometer cable connecting said tachometer means to said frequency-to-voltage converter means, and in which said safety circuit means further comprises means for monitoring the continuity of said tachometer cable and for disconnecting said summer means from said motor controller if continuity of said cable is broken.

6. The speed control circuit of claim 2, 4, or 5 in which said safety circuit means further comprises:

relay means for disconnecting said summer means from said motor controller, and relay delay means for providing a predetermined delay in operation of said relay means.

7. The speed control circuit of claim 6 in which said safety circuit means further comprises indicator means, actuated by said relay means, for providing a visual indication of operation of said safety circuit means.

8. The speed control circuit of claim 1 in which said speed selector means includes a dead band compensation circuit for compensating for the dead band of said operator adjustable speed control mechanism.

9. The speed control circuit of claim 1 in which said fork height sensor comprises ultrasonic height measuring means for measuring the height to which said lift forks are raised and for providing said fork height signal.

10. The speed control circuit of claim 1 in which said speed sensor means comprises:

tachometer means, responsive to movement of said lift truck, to provide a tachometer output signal related in frequency to the speed of said lift truck, frequency-to-voltage converter means, responsive to said tachometer output signal, for providing an output signal related in potential to the speed of said lift truck, low pass filter means for filtering said output signal from said converter means, and lead circuit means, responsive to said filtered output signal from said low pass filter means, for compensating for a phase lag induced in said output signal during filtering by said low pass filter means and for providing a speed sensor signal to said summer means.

* * * * *